(12) United States Patent  
Hurwitz

(10) Patent No.: US 7,932,820 B2
(45) Date of Patent: Apr. 26, 2011

(54) HIGH VISIBILITY SAFETY HELMET SYSTEM

(75) Inventor: Marni Markell Hurwitz, Far Hills, NJ (US)

(73) Assignee: I Did It Inc.

( * ) Notice: Subject to any disclaimer, the term of this patent is extended or adjusted under 35 U.S.C. 154(b) by 658 days.

(21) Appl. No.: 11/880,206

(22) Filed: Jul. 21, 2007

(65) Prior Publication Data

US 2009/0021365 A1 Jan. 22, 2009

(51) Int. Cl.
*B60Q 1/44* (2006.01)

(52) U.S. Cl. .................................. 340/479; 340/432

(58) Field of Classification Search .......... 340/479, 340/432, 467, 539.32, 539.13, 825.49; 362/106, 362/84

See application file for complete search history.

(56) References Cited

U.S. PATENT DOCUMENTS

| | | | | |
|---|---|---|---|---|
| 3,566,014 A * | 2/1971 | Norem | ........................ | 348/803 |
| 4,319,308 A | 3/1982 | Ippoliti et al. | ............... | 362/106 |
| 5,327,587 A | 7/1994 | Hurwitz | ............................ | 2/422 |
| 5,743,621 A | 4/1998 | Mantha et al. | ............... | 362/105 |
| 5,810,467 A * | 9/1998 | Hurwitz | ........................ | 362/106 |
| 7,121,676 B1 | 10/2006 | Kuynyak | ..................... | 362/105 |
| 7,221,263 B2 | 5/2007 | Moore et al. | ................ | 340/427 |
| 7,232,246 B2 | 6/2007 | Kleber et al. | ................ | 362/506 |
| 2004/0008106 A1 * | 1/2004 | Konczal | ....................... | 340/432 |
| 2004/0240198 A1 | 12/2004 | Van Laar | ..................... | 362/105 |
| 2005/0134439 A1 * | 6/2005 | Moore et al. | ................ | 340/432 |
| 2005/0180129 A1 * | 8/2005 | Harris | ........................... | 362/105 |
| 2006/0222278 A1 * | 10/2006 | Singh et al. | ................ | 384/448 |
| 2007/0008095 A1 * | 1/2007 | Gwinn et al. | ................ | 340/476 |

* cited by examiner

Primary Examiner — Shirley Lu
(74) *Attorney, Agent, or Firm* — Ernest D. Buff & Associates, LLC; Ernest D. Buff; Harry Anagnostopoulos

(57) ABSTRACT

A safety helmet system for motorcycle and bicycle riders includes a lightweight impact resistant helmet having an on/off switch. A power supply lights an electroluminescent strip surrounding the outer periphery of the helmet, signaling at eye level the presence of the rider to all drivers in the vicinity. The power supply also powers a single axis accelerometer having its sensitive axis oriented along the Cycle's travel direction. A microprocessor captures maximum deceleration in a braking cycle. The captured deceleration is segmented into low, medium and high values. A plurality of LED lights are mounted on the back face of the helmet. The microprocessor turns on LED arrays to create progressively increasing LED lit areas in direct proportion with the Cycle deceleration rate. Vehicle drivers following the Cycle are provided information concerning the Cycle's deceleration rate, enabling them to brake and thereby avoid colliding with the Cycle; the margin of safety is significantly increased for Cycle riders and drivers of following vehicles.

11 Claims, 3 Drawing Sheets

HIGH VISIBILITY SAFETY HELMET SYSTEM

BACKGROUND OF THE INVENTION

1. Field of the Invention

The present invention relates to a high visibility safety helmet system; and more specifically to a safety helmet worn by motorcycle and bicycle riders that signals the motorcycle or bicycle's deceleration rate, thereby preventing accidents and injury to motorcyclists.

2. Description of the Prior Art

Many patents address issues related to providing safety helmets with illuminating or reflecting features. Some of the helmet lights are responsive to vehicle brake deceleration, but the vehicle's deceleration rate is not communicated to other surrounding automotive drivers.

U.S. Pat. No. 4,319,308 to Ippoliti et al. discloses a motorcycle helmet, which makes use of LEDs to direct light between two thin shells of curvilinear profile. Characters, such as alphabet letters, are thereby illuminated on the side of the helmet. The light sources are located in the bottom of the helmet to direct light upwardly in a direction generally parallel to the thin shells. Light is reflected between the shells due to the shells' curvilinear profile. The lights are not on the rear face of the helmet and are not illuminated according to the deceleration of the motorcycle.

U.S. Pat. No. 5,327,587 to Hurwitz discloses an illuminated safety helmet. At least one electroluminescent strip is permanently adhered to a helmet shell. The electroluminescent strip is powered by a power unit arranged on the helmet shell. The power unit can comprise a rechargeable battery. Power is supplied to the electroluminescent strips when an ON/OFF switch is turned ON. The electroluminescent light on the helmet is not actuated in response to deceleration of a motorcycle.

U.S. Pat. No. 5,743,621 to Mantha et al. discloses an illuminated safety helmet. A pair of LED modules that is mounted at the front and back of the helmet. An electrical circuit with an on-board battery powers the LEDs. The helmet has a chin strap fitted with snap together connectors which when joined operate to secure the helmet on the user's head. A pair of electrical contacts is incorporated into the connectors and operates as a switch, which closes and opens the circuit, respectively, with the engagement and disengagement of the connectors. The lights are not turned on according to the deceleration of a motorcycle.

U.S. Pat. No. 5,810,467 to Hurwitz discloses an electroluminescent illuminated protective hat such as a hard hat, helmet or the like. A retrofit unit retrofits existing protective hats to include an electroluminescent illumination device. At least one electroluminescent lamp is secured to a shell of the protective hat. The lamp is powered by a power unit comprising a rechargeable battery housed within the protective hat shell. A retrofit unit includes at least one electroluminescent lamp and power unit portion. Existing protective hats are retrofitted with the electroluminescent lamp and power unit portion. Both the electroluminescent lamp and the power unit portion of the retrofit unit can be either permanently or temporarily secured to a protective hat. This retrofit electroluminescent lamp does not respond to the deceleration of a motorcycle to thereby signal following vehicles that the motorcycle is braking.

U.S. Pat. No. 7,121,676 to Kutnyak discloses an illuminated protective headgear. This illuminated protective headgear has an inner core of resilient cushioning material with cavities. An outer shell with portions overlies the core with windows that are clear to translucent or open and are of graphical configuration disposed on opposite sides of the headgear. A power circuit supported by said inner core with lighting panels has light sources disposed in the cavities so as to be viewed through a respective window. Timing circuitry times the on-off sequence of the lights, so as to create an effect of motion of the illumination within each window. The lights in this recreational helmet are not turned on in response to the deceleration of a motorcycle or bicycle.

U.S. Pat. No. 7,221,263 to discloses a helmet lighting system. This lighting system is mounted on a motorcycle or bicycle helmet. The lighting system includes one or more accelerometers coupled to the helmet and a processor adapted to process the signals from the accelerometers. The accelerometers may be mounted to the helmet, or to the motorcycle or bicycle. The lighting system further includes two rows of LED lights mounted on the helmet. The LED lights are responsive to the processed signal so that the light illuminates as the result of a deceleration force. The system may also include filtering software to remove helmet motion artifact and other noise from the signal. Remote wheel speed indicators may also be used in conjunction with or in place of the accelerometers. Mounting tabs releasably attach the lighting unit to the helmet. In the '263 disclosure, the light is generally in the "off" condition and is illuminated only when the vehicle decelerates.

U.S. Pat. No. 7,232,246 to Kleber, et al, discloses an illuminated panel portion for vehicles and vehicular accessories. A generally translucent panel defines a selected design. The translucent panel is disposed in an aperture of an adjacent panel of the vehicle or vehicle accessory such that the outer surfaces of the translucent panel and adjacent panel are substantially flush. A light source is disposed in relation to the panel for illuminating the translucent panel. Vehicular speed is not correlated with increased light intensity.

U.S. Pat. No. 7,221,263 to Moore, et al. discloses a helmet lighting system. The lighting system is adapted to be mounted on a motorcycle or bicycle helmet. The lighting system includes one or more accelerometers coupled to the helmet and a processor adapted to process the signals from the accelerometers. The accelerometers may be mounted to the helmet, or the motorcycle or bicycle. The lighting system further includes a light mounted on the helmet that is responsive to the processed signal such that the light illuminates as result of a deceleration force. The system may also include filtering software to remove helmet motion artifact and other noise from the signal. Remote wheel speed indicators may also be used in conjunction with or in place of the accelerometers. The vertical and horizontal accelerometers are used to drive the lighting system. They are not designed to react to the deceleration rate of the motorcycle or bicycle.

US Patent Application 20040240198 to Van Laar discloses an automated self-illuminating sports & safety helmet. A intelligent sports and safety helmet designed for bicyclists, skateboarders, snowboarders, skiers, other sports enthusiast as well as industrial, military and security services utilizes a helmet or head protection while performing an activity or duty. The helmet consists of a sports or safety helmet with a microprocessor, a set of sensors and a software program residing within the microprocessor. In operation electronic sensors automatically detect if the user is wearing helmet and if environmental conditions warrant self-illumination. The microprocessor manages the state of the illuminating elements. This '198 device does not suggest a high visibility electroluminescent helmet that is always lit, and a plurality of illuminating lights operative in response to the motor cycles deceleration rate. Rather, in the '198 Publication, motion detection is used to assure that the helmet is on when the vehicle is moving (and not just sitting in a dark closet on a shelf). The '198 publication broadly discloses an "on" program wherein the helmet can be flashing, steady state or sequencing depending on the light level in the environment wherein the helmet resides, so that passing under lights or stopping at a stop light will not deactivate the unit.

There remains a need in the art for a helmet worn by a motor cycle or bicycle rider that clearly indicates the presence of the motorcycle on the road at all times and signals following vehicles that the motorcycle or bicycle is decelerating, thereby warning drivers of proximate vehicles and providing them with an increased margin of safety.

SUMMARY OF THE INVENTION

The present invention is directed to a high visibility safety helmet system for use by motorcycle and bicycle ("Cycle") riders that has an electroluminescent strip surrounding the bottom periphery of the helmet. The electroluminescent strip is powered by a power source. A battery, preferably a rechargeable battery, or a direct plug-in connected to the Cycle's on-board power through an on-off switch, and is lit while the wearer is riding the Cycle. The same power source powers an analog or digital accelerometer, a microprocessor and arrays containing a plurality of light emitting diode (LED) lights. Both analog and digital accelerometers are available in a variety of measurement configurations. These configurations include a capacitive acceleration sensor, a piezoelectric acceleration sensor, a Hall effect acceleration sensor, a magnetoresistive acceleration sensor, a heat transfer acceleration sensor and mechanical spring and ball type accelerometers. These accelerations sensors may provide analog or digital electrical outputs representing the deceleration detected. They also have very different g-force detection range and have different ability to withstand high g-force mechanical shock.

The preferred acceleration sensor is a capacitive micromachined sensor that responds to accelerations perpendicular to the thickness direction of the sensor device. This analog output device is smaller than a penny. It outputs about 0-5 volts, based on the acceleration of a helmet sensor in its direction of travel. Acceleration is represented in the range of −5 g to +5 g, for example, by a Model 1220 or a Model 1221 analog accelerometer from Silicon Designs Inc., 1445 Mall Street, Issaquah, Wash. 98027 web address www.silicondesigns.com. When there is no acceleration, the voltage output is 2.5 volts. Thus, a voltage less than 2.5 volts represents deceleration while any voltage output greater than 2.5 volts represents acceleration. When the output is zero volts, the deceleration is −5 g and the output voltage in the range of 0 to 2.5 volts correlates linearly according to deceleration in the range of −5 g to 0 g. This is a hermetically sealed nitrogen damped capacitive micro machined sensor operating at an input voltage of 5 volts DC with a typical input current of 7 milliamps, thus consuming very little supply power. The acceleration sensitive axis is perpendicular to the package and is mounted on a vertical surface of the helmet to measure the deceleration of the helmet.

The voltage output of the acceleration sensor is sent to a microprocessor, which captures the highest deceleration detected in a braking cycle and segments the voltage output from 2.375 volts to 2 volts representing 0.25 to 1 g acceleration as a low deceleration group. A voltage output from 2 volts to 1.5 volts which represents an acceleration of 1 g to 2 g is classed as a medium deceleration group. A voltage output from 1.5 volts to 0 volts represents 2 g to 5 g and is classed as a high deceleration group. The microprocessor powers three sets of light emitting diodes (LED) arranged in the form of concentric circles or diamonds according to the group of deceleration detected. The innermost circle or diamond LED array is turned on when low a deceleration group is detected. When the medium deceleration group is detected, both the inner most circle or diamond LED together with the next concentric circle or diamond LED array is turned on. When the high deceleration group is detected, both the inner most circle or diamond LED together with the next two concentric circle or diamond LED array are turned on. The LED light arrays are turned on for a period ranging from 20 seconds to 60 seconds. An automobile driver directly behind the Cycle will observe the progressively larger area of brightly lit red colored light emitting diodes, recognizing that the Cycle is under progressively increased deceleration. When the voltage output from the sensor is in the 2.5 volts to 2.375 volts, none of the light emitting diode arrays is lit and no Cycle deceleration warning is communicated.

The helmet has an electroluminescent strip directly below the array of light emitting diodes. This electroluminescent strip essentially encircles the periphery of the safety helmet and connected to the on-board battery power through a switch and stays on all the time. This electroluminescent strip indicates to all automobile drivers in the vicinity of the Cycle at eye level the presence of the Cycle in the road. The electroluminescent strip glows with a pleasant blue-green color and has a pleasing appearance. Since white light emitting electroluminescent strips are readily available, a color filter may be used to produce any desired color for this Cycle presence indicating electroluminescent strip.

Generally stated, the invention provides a high visibility helmet for cyclists that has an electroluminescent strip encircling the helmet. The electroluminescent strip is always lit when the helmet is in use. It has a plurality of LED lights on the helmet back side arranged in a concentric or diamond shaped configuration. The LED lights are lit sequentially in progressively larger area that correlates with the intensity of deceleration of the Cycle. A single axis acceleration sensor detects the intensity of deceleration. A microprocessor classifies the detected deceleration into a low, medium or high group representing 0.5 g to 1 g, 1 g to 2 g and 2 g to 5 g. This triggers illumination of a progressively larger area of lit LEDs on the back side of the helmet.

In one aspect, the invention comprises a multiple LED lighting system adapted to mount on the backside of a Cycle rider's helmet. The lighting system includes a single axis accelerometer coupled to the helmet with its sensitive axis along the direction of travel of the Cycle, and a processor coupled to the single axis accelerometer, wherein the processor is adapted to process a signal from the accelerometer detecting low, medium or high deceleration. The lighting system further includes a plurality of LED lights arranged in progressively increasing area of LED light illumination connected to the processor, wherein the light is mounted on the back side of the helmet and is responsive to the processed signal such that the LED light area illuminates into progressively larger area as result of an increased deceleration of the Cycle. The LED lights can be arranged in a series of concentric circles or ellipses, or as concentric polygons, such as squares, rectangles, diamonds, octagons and the like.

The lighting system has a power source coupled to the electroluminescent strip, a single axis accelerometer, a processor and plurality of LED lights. The lighting system may also have a power switch coupled to the power source for turning the system on and off. The power source may be a battery, preferably, a rechargeable battery and may have optional plug connection with Cycle on-board battery power.

In a preferred mode of the present aspect, the LEDs are red in color immediately communicating to automobile drivers directly behind the Cycle of the deceleration rate of the Cycle, the indication presented at the eyelevel of the automobile driver. The electroluminescent strip has a pleasant blue green color surrounding the entire periphery of the safety helmet, which is on all the time when the helmet is in use, signaling the presence of the Cycle to following vehicle drivers. The color of the electroluminescent strip may be adjusted to emit practically any color, by placing a filter over a white electroluminescent strip.

BRIEF DESCRIPTION OF DRAWINGS

The invention will be more fully understood and further advantages will become apparent when reference is had to the following detailed description and the accompanying drawings, in which.

DESCRIPTION OF THE PREFERRED EMBODIMENTS

Figure 1:
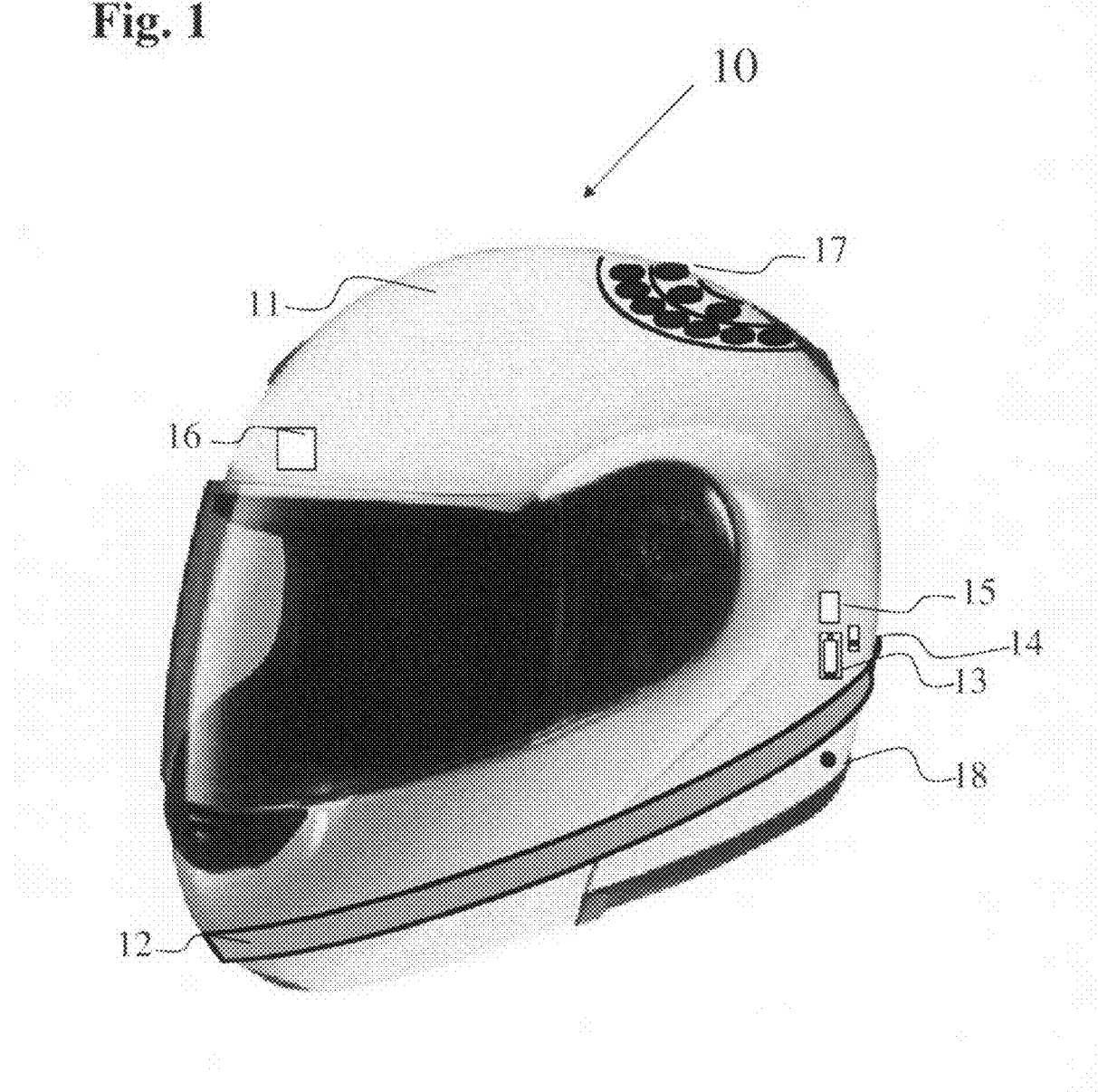
FIG. 1 is a schematic view of the safety helmet showing the electroluminescent strip and plurality of light emitting diodes arranged in a concentric circular configuration on the backside of the helmet.

Two-wheeled vehicles, such as motorcycles with large engine capacity and multi-gear bicycles have become increasingly popular for transportation and recreational use. Unfortunately, the accident risks associated with riding these Cycles in automobile traffic are generally higher than driving an automobile for several reasons. Cycles are smaller than automobiles. Consequently, other motorists often have a hard time seeing Cycles on the roads. Motorcycles are generally capable of higher rates of acceleration and deceleration than automobiles, due to their significantly lower mass and larger engine and braking system capacity. This combination of features oftentimes enables Cyclists to decelerate at a higher rate than following vehicles. The higher acceleration capability of a motorcycle frequently enables it to weave in and out of small spaces between automobiles. When this occurs, following vehicles tend to lose track of the position of a nearby motorcycle, increasing chances for an accident. Cycles lack the weight and protective structure, as well as other safety devices, such as airbags, that are frequently present in automobiles. In an effort to mitigate the dangers presented when riding such vehicles, government legislation has made mandatory a helmet law that requires motorcycle riders to wear helmets. While these safety precautions do provide some added safety, operation of two-wheeled vehicles continues to present serious risks owing to their reduced size and the minimum space allocated thereon for lighting systems. Due to the relatively low profile of two-wheeled vehicles, lighting systems carried thereon are located below the eye level of automobile drivers, making them difficult to see.

In the mid 80's, the U.S. government researched automotive taillight positioning and found that significantly fewer accidents occur in vehicles having a brake light positioned at or near the highest point on the rear of the vehicle. In 1986, the U.S. government mandated that automobiles sold in the U.S. be equipped with a third brake light positioned near the highest point on the rear of the vehicle. To date, a similar law has not been passed for motorcycles. Consequently, motorcycle lights are positioned well below the eye level of an automobile or truck driver. In addition, most Cycles have single light taillights. It becomes difficult for many motorists to judge and maintain a safe following distance, since a Cycle's small brake light is not easily "picked" by the "stereoscopic" vision of an automobile driver. A single taillight not only has a smaller illuminated area. It impedes the ability of drivers in following vehicles to judge stopping distance, even when such drivers have good eyesight.

In addition, Cyclists generally apply brakes less often than motor vehicles when decelerating. Owing to the high horsepower-to-weight ratio of a motorcycle, many motorcyclists decelerate without the use of brakes. During operation of the Cycle, such motorists tend to applying the brakes principally at slow speeds to bring the Cycle to a full stop. Thus, a motorcyclist frequently decelerates without any warning to other motorists via the brake light. This, in turn, results in decreased stopping distances as compared to those encountered by drivers of four-wheel vehicles.

The present invention provides a brake light that more closely approaches the line of vision enjoyed by an automobile driver following the Cycle. In accordance with the invention, brake light illumination increases in direct proportion to the rate of deceleration of the motorcycle. That is, when the deceleration rate is high, a larger area of brake light is illuminated. This, in turn, signals the driver of a following vehicle, enabling that driver to apply brakes immediately and thereby prevent an accident. In addition, the safety helmet of the present invention has an illuminated electroluminescent strip that is always in the "on" condition, and clearly visible to all automobile drivers in the vicinity of the Cycle.

Both analog and digital accelerometers suited for the safety helmet are available in a variety of measurement configurations. Analog accelerometers provide an analog output, typically a current in the range of 4 to 20 milliamps or an output voltage of −5V to +5V according to the g-force detected. Digital accelerometers output a pulsed high frequency waveform with a varying square wave pulse width and therefore, the frequency. A capacitive acceleration sensor uses a metal beam or micro-machined feature to produce a capacitance which changes with the acceleration of the device. A piezoelectric acceleration sensor uses a piezoelectric crystal mounted on a mass, and the piezoelectric voltage output is converted to acceleration. A piezo-resistive acceleration sensor has a beam or micro-machined feature whose resistance changes with acceleration. A Hall effect acceleration sensor converts motion to an electrical signal by the sensing of a changing magnetic field. A magnetoresistive acceleration sensor detects changes in material resistivity in the presence of a magnetic field. More recently heat transfer acceleration sensors have been produced which track location of a heated mass during acceleration by sensing temperature. Several of these acceleration sensors react at high frequencies and therefore any mechanical vibration of the sensor is reported as a very high value of g-force. Mechanical spring and ball type accelerometers are also available. The reliability of such accelerometers is poor as compared to other accelerometers due to their bounce characteristics and ball sticking behavior. Accordingly, mechanical spring and ball type accelerometers are not preferred for safety helmet applications. Digital accelerometers are highly reliable and are not damaged when the sensor is subjected to high g-forces. In addition, these sensors detect acceleration in more than one axis.

Analog devices Inc. produces digital output multi-axis accelerometers. These digital devices directly couple to a microprocessor to determine the acceleration or deceleration. For example, iMEMS sensor ADXL202/JQC/AQC measures ±2 g, while sensor ADXL210/JQC/AQC measures ±10 g.

Silicon Devices Inc. produces digital output multi-axis accelerometers based on micro electro mechanical (MEMs) technology. A LIS3LV02DQ sensor is a 3-Axis—±2 g/±6 g digital output low voltage linear accelerometer.

Honeywell Inc. produces piezoelectric accelerometers such as SENSOTEC Model MA21 miniature, low profile amplified piezoelectric accelerometers. These devices are designed to be used in Industrial test and automation environments; including laboratory testing, modal studies and test cells where head room is limited and where a low profile unit is desirable. The constant current low output impedance output combined with the ability to drive high load capacitance allows long runs of low cost cable without degradation of data. The Model MA21 features a high natural frequency, a wide frequency range and a flat sensitivity vs. temperature response over the temperature range. The seismic element is mechanically isolated from the mounting base, resulting in a low base strain sensitivity. The stainless steel materials are non-magnetic, resulting in very low magnetic field susceptibility. These features, together with a sealed body, assure accurate and reliable data. This is a high frequency acceleration detector with a dynamic range of ±80 g.

Honeywell Q-flex® QA650 accelerometer can detect ±30 g and is an etched quartz flexure system with an analog output. It is typically used in automotive applications. Honeywell SIMMA SA500 accelerometer is a micro machined silicon accelerometer with two silicon beams vibrating at different frequencies; and their frequency difference is used to determine the g-value. Such an accelerometer is capable of detecting ±80 g and produces a digital wave output, whose frequency depends on the g-value. This Honeywell accelerometer is typically used in aerospace applications.

While, many of the accelerator sensors may be suitably designed for the safety helmet, some sensors are more suited than others for the safety helmet application. Only one of the three accelerometer axis needs to be used, with the in-use axis pointing along the travel direction of the motorcycle. If the accelerometer sensor is sensitive to high frequency vibrations, the latter should be filtered out to recover the steady deceleration of the motorcycle.

The preferred acceleration sensor is a capacitive micromachined sensor that responds to accelerations perpendicular to the thickness direction of the sensor device. This analog output device is smaller than a penny. It outputs 0-5 volts based on the acceleration of the sensor in a helmet in its direction of travel. This output represents acceleration in the range of −5 g to +5 g. See, for example, Model 1220 or Model 1221 analog accelerometer from Silicon Designs Inc., 1445 Mall Street, Issaquah, Wash. 98027 web address www.silicondesigns.com. When there is no acceleration, the voltage output is 2.5 volts. Thus a voltage less than 2.5 volts represents deceleration while any voltage output greater than 2.5 volts represents acceleration. When the output is zero volts, the deceleration is −5 g and the output voltage in the range of 0 to 2.5 volts correlates linearly according to deceleration in the range of −5 g to 0 g. This is a hermetically sealed nitrogen damped capacitive micro machined sensor operating at an input voltage of 5 volts DC with a typical input current of 7 milliamps, thus consuming very little supply power. With this arrangement, the acceleration sensitive axis is perpendicular to the package and is mounted on a vertical surface of the helmet to measure the deceleration thereof.

FIG. 1 schematically illustrates at 10 the safety helmet 11 with an always lit electroluminescent strip 12 and a plurality of LED lights 17 that respond to the deceleration of the motorcycle, as sensed by the single axis accelerometer 16 and evaluated by the microprocessor 15. The sensitive axis of the single axis accelerometer 16 is along its thickness and is therefore affixed on a vertical surface that is perpendicular to the direction of travel of the motorcycle. The electroluminescent strip is connected to battery power located at 13 through an on off switch 14. It may also be powered by a plug-in connection to the on-board battery power of the motorcycle. The electroluminescent strip remains lit constantly or intermittently during helmet use. That is to say, the strip can remain constantly in the on condition, or may "blink" or be otherwise cycled periodically to create a flashing lit condition throughout helmet use. The switch 14 also powers the single axis accelerometer 16, microprocessor 15 and plurality of light emitting diodes 17. The microprocessor interprets the output from the accelerometer and decides if the acceleration is of low magnitude, medium magnitude or high magnitude and correspondingly turns on a larger area of illumination of the LED lights. A holding circuit in the microprocessor captures the highest value of deceleration detected and keeps the LED illumination area for several seconds, typically 20 to 60 seconds so that automobile drivers directly behind the motorcycle will recognize the deceleration of the motorcycle and react accordingly.

Figure 2A:
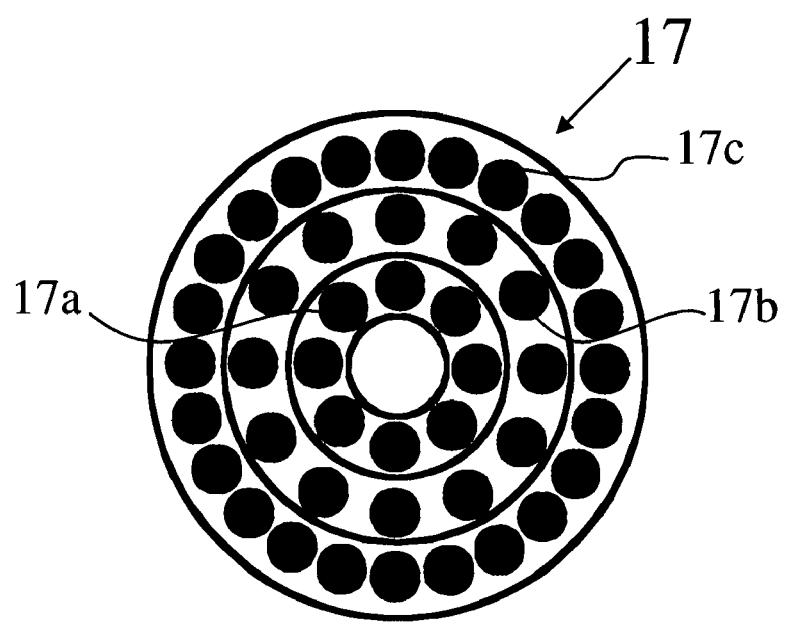
FIG. 2a is a schematic view of the backside of the safety helmet showing the plurality of light emitting diodes arranged in a concentric circular configuration.
Figure 2B:
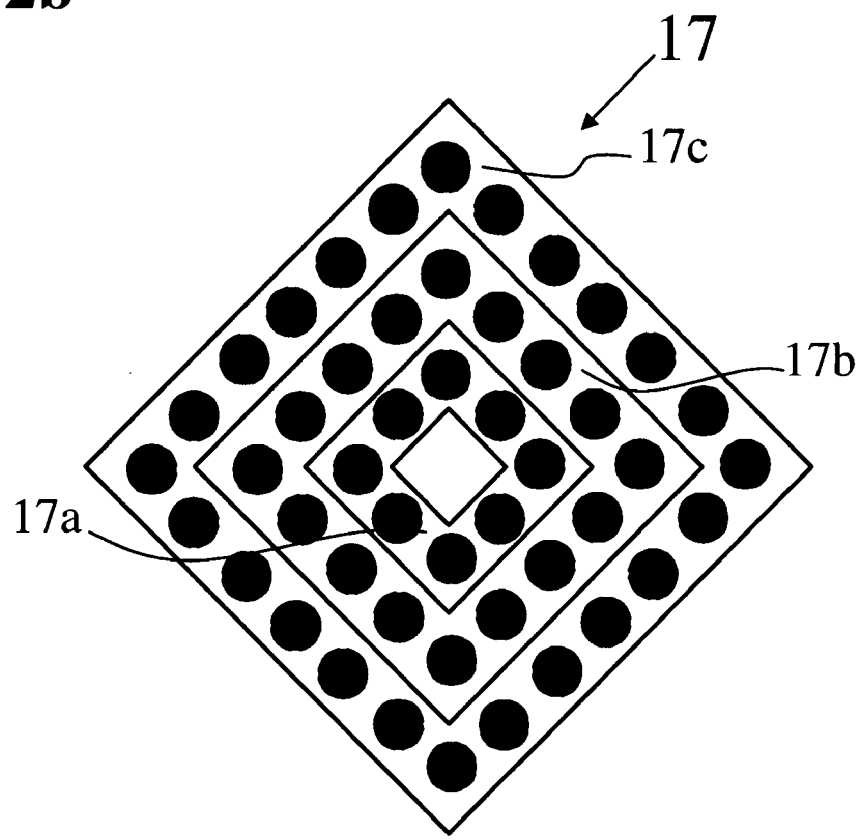
FIG. 2b is a schematic view of the backside of the safety helmet showing the plurality of light emitting diodes arranged in a multiple diamond-shaped configuration.

FIGS. 2a and 2b illustrate at 17 the configuration of the LED lights behind the helmet. FIG. 2a shows a concentric circular configuration of the LED lights in three arrays, while FIG. 2b shows the LED lights in a multiple diamond configuration. LED light array at 17a is lit when the deceleration detected is of a low value, typically in the 0.25 g to 1 g of deceleration. When the deceleration detected is in the medium range, typically 1 g to 2 g of deceleration range, both the inner most LED array 17a and the next LED array 17b are lit. When the deceleration detected is in the high range, typically 2 g to 5 g range of deceleration, both the inner most LED array 17a and the next LED array 17b and the outer most LED array 17c are lit at the same time, presenting a large LED light lit area to the automobile driver directly behind the motorcycle. When the deceleration is below the low range, typically below 0.25 g of deceleration, LED lights 17a, 17b and 17c are not lit.

Figure 3:
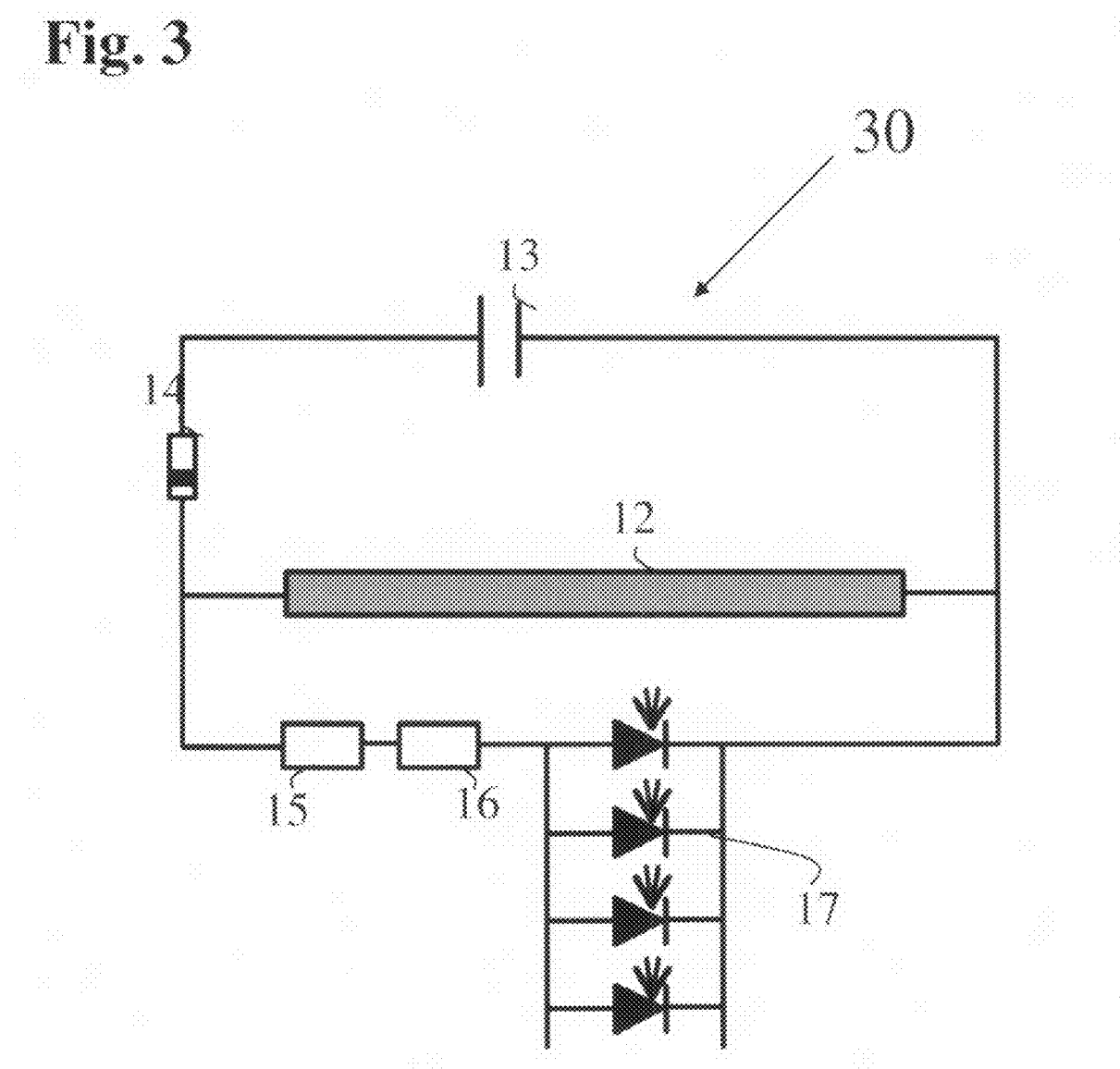
FIG. 3 is a schematic view of the electrical circuit, indicating a battery power source, a switch, a single axis accelerometer, a micro-processor, an electroluminescent strip and a plurality of LED lights.

FIG. 3 schematically illustrates at 30 a typical circuit diagram of the safety helmet system. The circuit has a battery or a plug-in connection at 13 that powers the circuit through a switch 14. An electroluminescent strip 12 is connected to the power through the switch 14. The same switch also supplies electrical power to the microprocessor 15, single axis accelerometer 16 and array of light emitting diodes 17.

The safety helmet system for Cycles comprises, in combination, the following salient features:
1. a lightweight high impact strength safety helmet worn by a rider of a Cycle;
2. said helmet having a power supply
3. said power supply being a battery that is, preferably, rechargeable and housed in an enclosed compartment, or is powered by a direct plug-in connection to Cycle on-board power;
4. said power supply being turned on or off by an on/off switch;

5. an electroluminescent strip connected to said power supply through said on/off switch and remaining lit constantly or intermittently during helmet use;
6. a single axis accelerometer, a microprocessor and arrays comprising a plurality of LEDs connected to said power supply through said on/off switch;
7. said single axis accelerometer sensitive axis being substantially in alignment with the direction of travel of said motorcycle;
8. said microprocessor receiving and locking the highest deceleration data from said single axis accelerometer and classifying deceleration into low medium or high deceleration; and
9. said microprocessor turning on an innermost LED array for low deceleration, turning on innermost and the next LED contiguously located array for medium deceleration, and turning on the innermost LED array, the contiguously located next array and the outermost LED array for high deceleration, thereby illuminating a progressively larger LED lit area as deceleration increases for a time period from 20 to 60 seconds;

whereby said lit LED arrays facing the backside of the helmet communicate to an automobile driver directly behind the Cycle information concerning the deceleration rate of the Cycle, enabling the automobile driver to apply brakes in a timely manner, preventing accidents and enhancing the safety of the Cycle rider.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A safety helmet system for motorcycle and bicycle ("Cycle") riders, comprising:
   a. a helmet power supply means;
   b. said power supply means supplying power to an electroluminescent strip through an on-off switch;
   c. said electroluminescent strip surrounding the periphery of said helmet and remaining lit constantly or intermittently during helmet use;
   d. said electroluminescent strip, when lit, emits a white color, and said strip comprises light filters of a color selected from the group consisting of red, yellow, orange and blue;
   e. said power supply means powering a single axis accelerometer with sensitive axis oriented along motorcycle travel direction, a microprocessor, and arrays or plurality of light emitting diodes (LEDs) located on the back side of said helmet;
   f. said microprocessor capturing highest deceleration data from said single axis accelerometer in a motorcycle braking cycle, and segmenting said deceleration data into low deceleration, medium deceleration and high deceleration;
   g. said microprocessor turning on an innermost LED array for low deceleration rate, an innermost and next LED array for medium deceleration rate and an innermost array, an next array and an outermost LED array for high deceleration rate, presenting a progressively larger LED lit area to automobile drivers directly behind said Cycle;
   h. said single axis accelerometer delivers deceleration data to said microprocessor as analog data;
   i. said LED array, when lit, emits a red color; and
   j. said single axis accelerometer is a micro machined capacitive acceleration sensor with analog data delivery to said microprocessors;

whereby said lit electroluminescent strip communicates information concerning said Cycle to automobile drivers in the vicinity of said rider, and said lit LED arrays communicate deceleration rate to automobile drivers directly behind the Cycle enabling timely application of brakes that prevent rear end collisions and other accidents, thereby providing an improved safety margin for the Cycle rider.

2. A safety helmet system as recited by claim 1, wherein said LED array on the back side of the helmet is arranged as a concentric circles.

3. A safety helmet system as recited by claim 1, wherein said LED array on the back side of the helmet is arranged as concentric, multiple diamonds.

4. A safety helmet system as recited by claim 1, wherein said microprocessor lights said LED array for a period ranging from 20 seconds to 60 seconds upon deceleration of said Cycle.

5. A safety helmet system as recited by claim 1, wherein said single axis accelerometer is a member selected from the group consisting of a capacitive acceleration sensor, a piezoelectric acceleration sensor, a Hall effect acceleration sensor, a magnetoresistive acceleration sensor, a heat transfer acceleration sensor and mechanical spring and ball type acceleration sensor.

6. A safety helmet system as recited by claim 1, wherein said power supply means is a battery located in a battery compartment.

7. A safety helmet system as recited by claim 6, wherein said battery is rechargeable.

8. A safety helmet system as recited by claim 1, wherein said power supply means is a plug-in connection to a motorcycle's power source.

9. A safety helmet system as recited by claim 1, wherein said LED array on the back side of the helmet is arranged as concentric polygons.

10. A safety helmet system as recited by claim 9, wherein said polygons are members selected from the group consisting of squares, rectangles, diamonds, and octagons.

11. A safety helmet system as recited by claim 1, wherein said LED array on the back side of the helmet is arranged as concentric ellipses.

* * * * *